(12) United States Patent
Baumhoff et al.

(10) Patent No.: US 7,571,745 B2
(45) Date of Patent: Aug. 11, 2009

(54) EXHAUST-GASTIGHT DECOUPLING ELEMENT FROM STRIPWOUND HOSES

(75) Inventors: Dietmar Baumhoff, Siegen (DE); Karl-Heinz Münker, Hilchenbach (DE); Frank Bender, Drolshagen (DE); Stefan Hauk, Hilchenbach (DE)

(73) Assignee: Westfalia Metallschlauchtechnik GmbH & Co. KG, Hilchenbach (DE)

( * ) Notice: Subject to any disclaimer, the term of this patent is extended or adjusted under 35 U.S.C. 154(b) by 788 days.

(21) Appl. No.: 11/140,607

(22) Filed: May 27, 2005

(65) Prior Publication Data
US 2005/0274424 A1 Dec. 15, 2005

(30) Foreign Application Priority Data
May 28, 2004 (DE) .................. 10 2004 026 705

(51) Int. Cl.
*F16L 9/14* (2006.01)
(52) U.S. Cl. ................. 138/148; 138/114; 138/109; 138/135
(58) Field of Classification Search ................ 138/148, 138/114, 109, 121, 134, 135; 285/222.5
See application file for complete search history.

(56) References Cited

U.S. PATENT DOCUMENTS

| 2,056,840 | A | * | 10/1936 | Collom | 138/113 |
| 2,878,837 | A | * | 3/1959 | Burtt | 138/148 |
| 2,923,288 | A | * | 2/1960 | Burtt | 126/116 R |
| 3,209,856 | A | * | 10/1965 | Saunders | 181/228 |
| 6,116,287 | A | * | 9/2000 | Gropp et al. | 138/114 |
| 6,488,052 | B2 | | 12/2002 | Hupertz et al. | |
| 6,612,342 | B2 | * | 9/2003 | Godel et al. | 138/118 |

FOREIGN PATENT DOCUMENTS

| DE | 34 41 064 C2 | 5/1986 |
| DE | 38 04 208 A1 | 8/1989 |
| DE | 197 17 182 A1 | 10/1998 |
| DE | 198 20 863 A1 | 11/1999 |
| DE | 101 13180 C2 | 3/2003 |

* cited by examiner

*Primary Examiner*—Patrick F Brinson
(74) *Attorney, Agent, or Firm*—Henry M. Feiereisen; Ursula B. Day

(57) ABSTRACT

For connection of exhaust system pipe work, which is subject to vibration, a typical example of an application being in vehicle exhaust systems, a gas-tight decoupling element produced from stripwound hoses is used, which consists of two coaxially arranged, multi-layer stripwound metal hoses and axial edge elements. These elements form an annular cavity between the two stripwound hoses with a suitable pneumatic connection which is pressurized in the operating condition using ambient air or cleaned exhaust gas, the pressure being as high or higher than the dynamic pressure which is built up in the inside cylindrical exhaust system cavity as a result of exhaust gas flow.

13 Claims, 6 Drawing Sheets

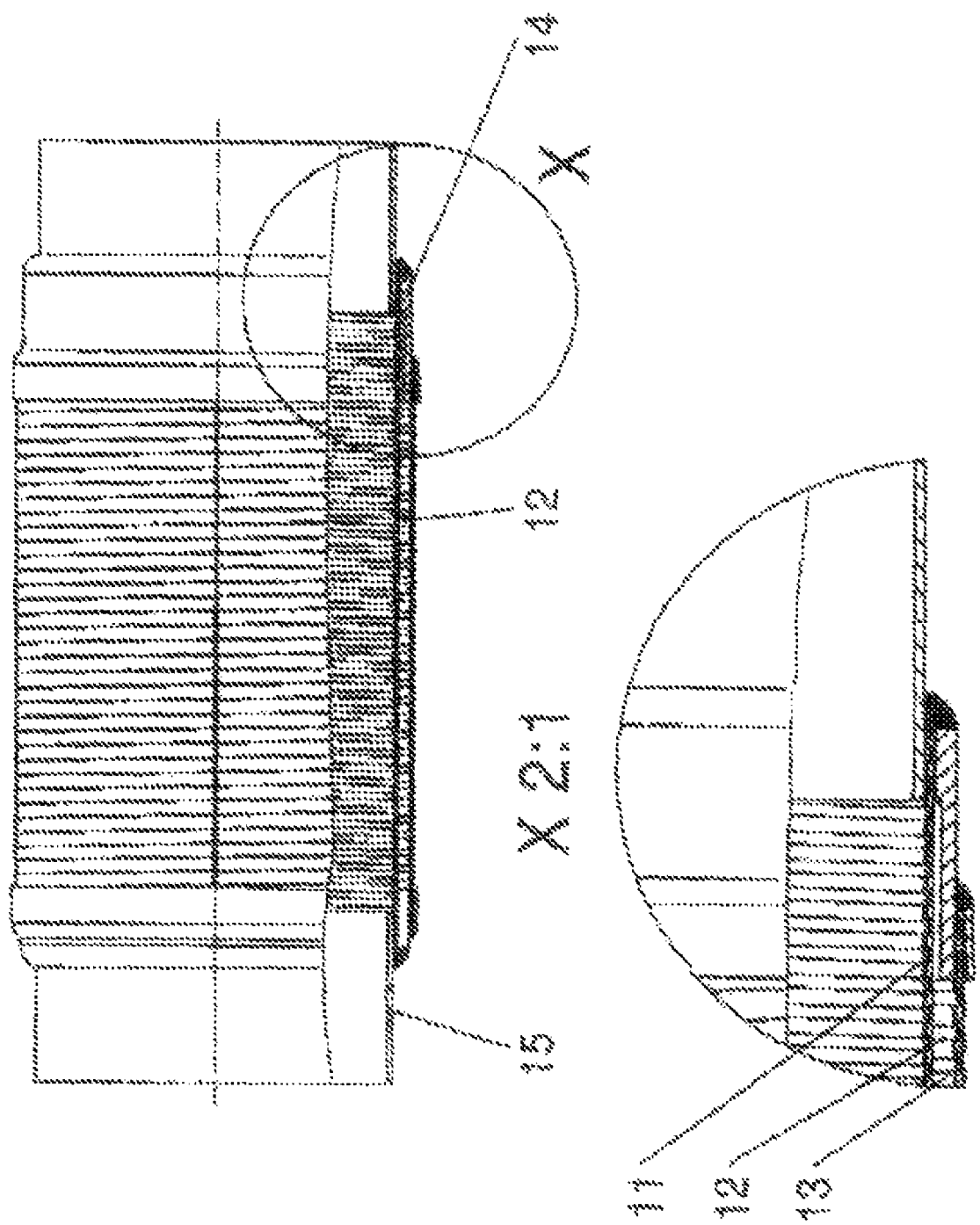

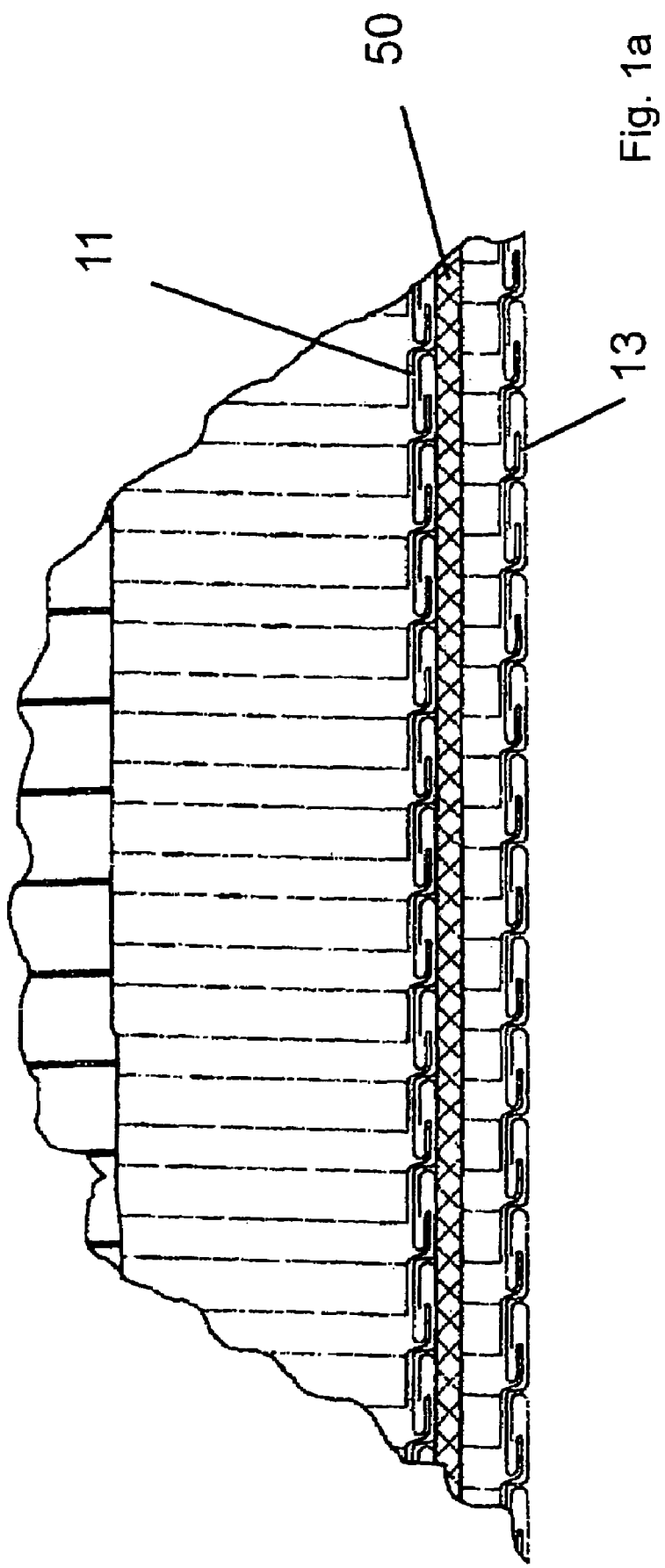

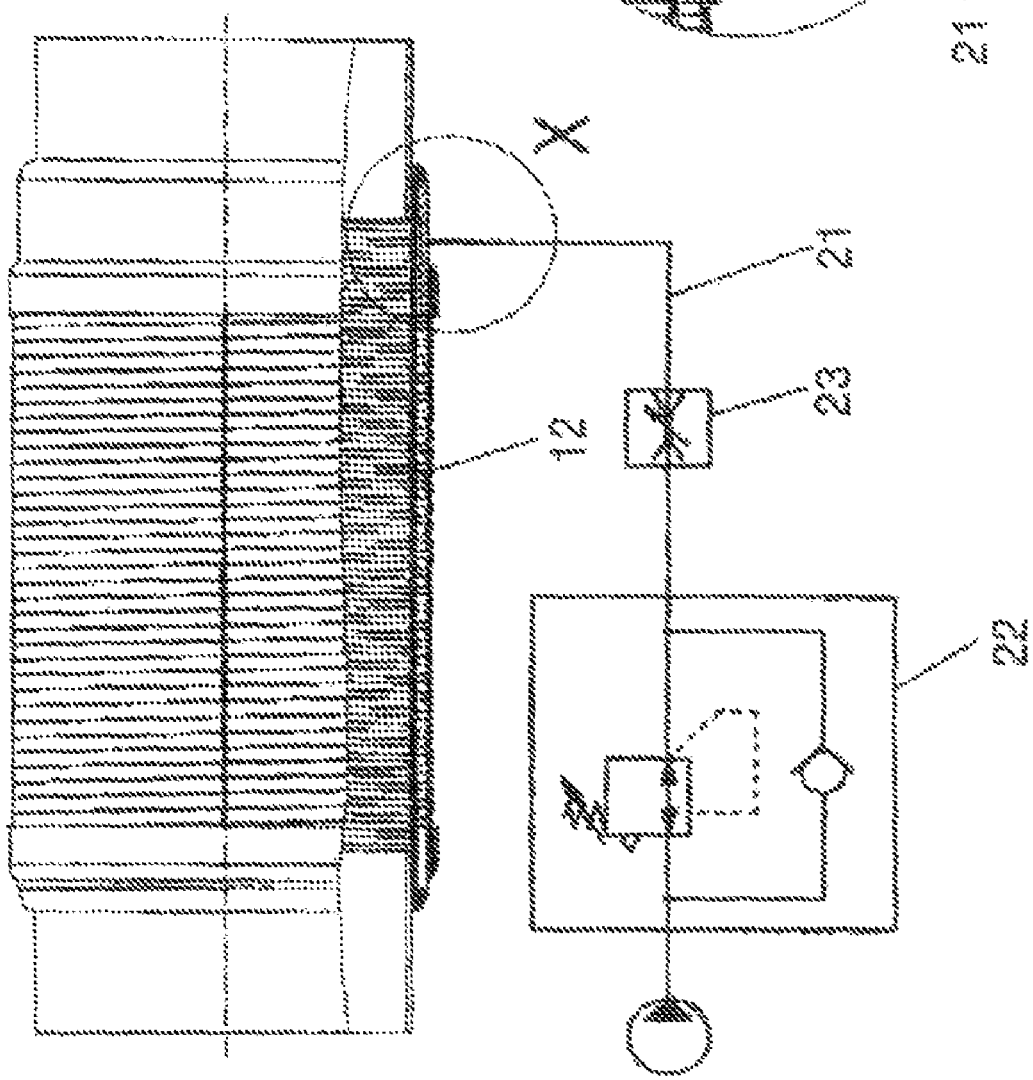

EXHAUST-GASTIGHT DECOUPLING ELEMENT FROM STRIPWOUND HOSES

FIELD OF THE INVENTION

The invention relates to a decoupling element for pipe work which is subject to vibration. A typical example of an application would be in vehicle exhaust systems.

BACKGROUND OF THE INVENTION

Such devices are intended to connect in a flexible manner, pipes that are subject to vibration, and to protect them from vibration. In order to meet the requirements of the automotive industry (passenger cars) for gas-tightness, a metal bellows-type is often part of such decoupling elements. As the large diameter variations in the convolutions of the metal bellows may lead to turbulences, a metal hose is usually incorporated into the pipe so as to ensure laminar gas flow. It must be ensured that noise generated during operation resulting from the metal hose hitting the inside of the bellows is kept to a minimum. This is often achieved by surrounding the hose with a braiding. DE 198 20 863 A 1 shows a flexible pipe as an example. Instead of using braiding, the metal hose and the metal bellows are connected at defined points so as to prevent the noise development described above.

In the range of commercial vehicles, multi-layer, stripwound metal hoses produced from profiled strip material are frequently used as decoupling element in exhaust systems. Since residual leakage is low yet permissible, it is not necessary to use a gas-tight element such as a metal bellows. A simple example of metal hoses used as decoupling elements is the so-called Agraff hose. Further examples, which exhibit a longer service life and a lower leakage rate than Agraff hoses, have been described in publications DE 344 1064 C2 and U.S. Pat. No. 6,488,052 B2.

Stripwound metal hoses are especially suitable for the exhaust systems of commercial vehicles as they allow for large offsets in the axial, lateral, and above all the torsional direction without structural tension being generated. Their disadvantage, however, is the remaining leakage.

As legal provisions worldwide will be stipulating a clearly reduced emission of pollutants from commercial vehicles, exhaust systems will increasingly be fitted with post-treatment modules such as soot filters and SCR systems. Leakage that may allow untreated exhaust gas to emerge from the system will be permissible only to a limited extent.

BRIEF DESCRIPTION OF THE DRAWINGS

FIG. 1 shows a schematic illustration of a gas-tight decoupling element according to the invention;

FIG. 1a shows a schematic illustration of a modified gas-tight decoupling element with incorporated braiding for dampening purposes;

FIG. 1b shows an enlarged detailed view of the area encircled in FIG. 1 and marked "X";

FIG. 2 shows a schematic illustration of the gas-tight decoupling element of FIG. 1 with external compressed air supply;

FIG. 2a shows an enlarged detailed view of the area encircled in FIG. 2 and marked "X".

DETAILED DESCRIPTION OF THE INVENTION

Figure 3:
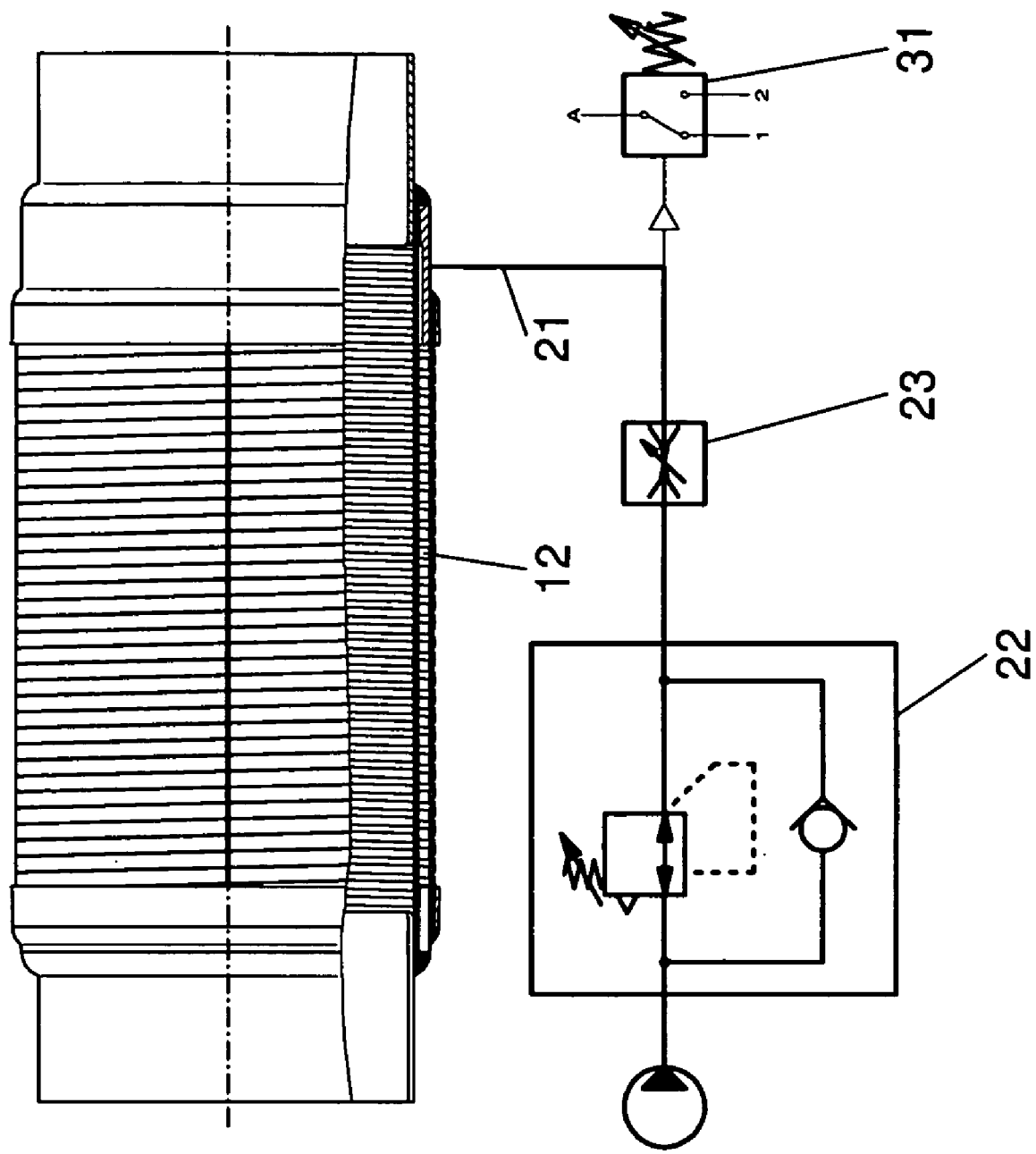
FIG. 3 shows a schematic illustration of the gas-tight decoupling element of FIG. 2 with incorporation of a pressure sensor.

The objective of the invention therefore is to provide an exhaust-gastight decoupling element for exhaust systems produced from stripwound hoses preventing leakage of exhaust gases to the atmosphere, which will enable it to meet future requirements of decoupling elements used in exhaust systems.

All the benefits of the stripwound hose, in particular coping with large offsets in the axial, lateral, and above all the torsional direction, shall be fully achieved.

The invention fulfils these objectives by an arrangement of stripwound hoses preventing the leakage of exhaust gases to the atmosphere by actively generating pressure in an annular cavity (12) which is arranged coaxially with the stripwound hose (11) (FIG. 1). FIG. 1b shows an enlarged detailed view of the area encircled in FIG. 1 and marked "X". This cavity is limited at the outer diameter by a second, coaxially arranged stripwound hose (13) and axially by suitable edge elements (14, 15) which preferably are positively jointed. In the annular cavity (12), a suitable dampening material such as braiding 50, as shown in FIG. 1a, may be accommodated which largely prevents metallic contact between the two stripwound hoses and the resulting noise generation when under vibration. A compressed air pipe (21) ensures permanent external supply of compressed air to the annular cavity between the two stripwound hoses (FIG. 2) so that there is always a higher pressure than the dynamic pressure in the inner hose through which the exhaust gas flows. FIG. 2a shows an enlarged detailed view of the area encircled in FIG. 2 and marked "X". This external compressed air supply can be achieved in vehicles preferably by using ambient air and a compressor which is commonly used e.g. in commercial vehicles. The supply can be limited using suitable pressure relief valves (22) and proportional valves (23). These kinds of pressure and volume flow limitations are sufficient for applications with uncontrolled exhaust gas post treatment. Furthermore, a closed-loop control may be included which adapts the pressure in the annular cavity to the dynamic pressure of the exhaust gas flow so that the pressure difference will be reduced. This is needed particularly when the permissible flow of ambient air into the exhaust gas which has not yet been subject to post treatment must be limited due to the integral sensor system (e.g., Lambda sensor).

Figure 5A:
FIGS. 5a-5d show various geometries of stripwound hoses for use in a gas-tight decoupling element according to the invention.
Figure 5B:
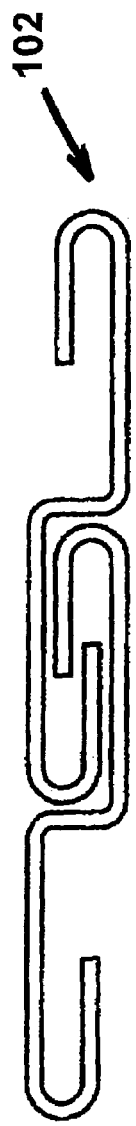
Figure 5C:
Figure 5D:
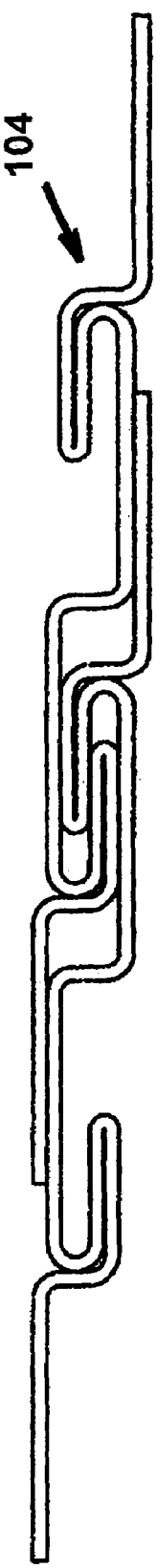

A decoupling element designed according to the described principle enables the use of stripwound metal hoses in an arrangement where no exhaust gas can escape to the environment. Both metal hoses in this set-up have residual leakage. However the residual leakage of the exterior hose to the atmosphere is ambient air that is either let off to the atmosphere through the wall of the exterior hose or to the exhaust gases through the wall of the interior hose. As various geometries of the stripwound hose lead to different leakage rates, a suitable combination of stripwound hoses with lay-on profile 101 (FIG. 5a), Agraff hoses 102 (FIG. 5b) and hose profiles of scale profile 103 (FIG. 5c) or of double scale profile 104 (FIG. 5d) according to the quoted patents DE 344 1064 C2 and U.S. Pat. No. 6,488,052 B2 may focus the preferred direction of leakage to the inner or the outer hose.

The invention described may be complemented by the inclusion of various sensor and control modules. In the basic version (FIG. 2), the decoupling element from stripwound hoses described, is supplied by a compressed air pipe (21) of limited cross-section. Furthermore, a pressure relief valve (22) and, as the case may be, a flow governor (23) are installed in the supply line. This enables an operation with a defined maximum pressure. The limited pipe cross-section in the supply line or the flow governor limit the leakage flow which must be extracted by the compressor in the case of a defective decoupling element to a value determined as a function of the design of the system. By this means, the central compressor of the vehicle can supply all other units requiring compressed air even when there is a defective decoupling element.

According to FIG. 3, the system described may be complemented by a pressure sensor (31) which in the case of a pressure drop in the annular cavity transmits a signal to the cab of the vehicle. In this way, the legal requirements for increased operational safety are catered to, and this applies to all elements involved in exhaust gas cleaning.

In a third variation, cleaned exhaust gases are used to supply the decoupling element made from stripwound hoses with compressed air. This is tapped from the system at a point downstream of the exhaust gas cleaning system. As the exhaust gas flow downstream of the exhaust gas cleaning system is always subject to a lower dynamic pressure than the area upstream of the cleaning, a suitable compressor must be installed.

A fourth version of the decoupling element produced from stripwound hoses provides for a compressed air supply from the air-stream using an appropriate RamAir or Airbox as well as a suitable compressor if needed.

Figure 4:
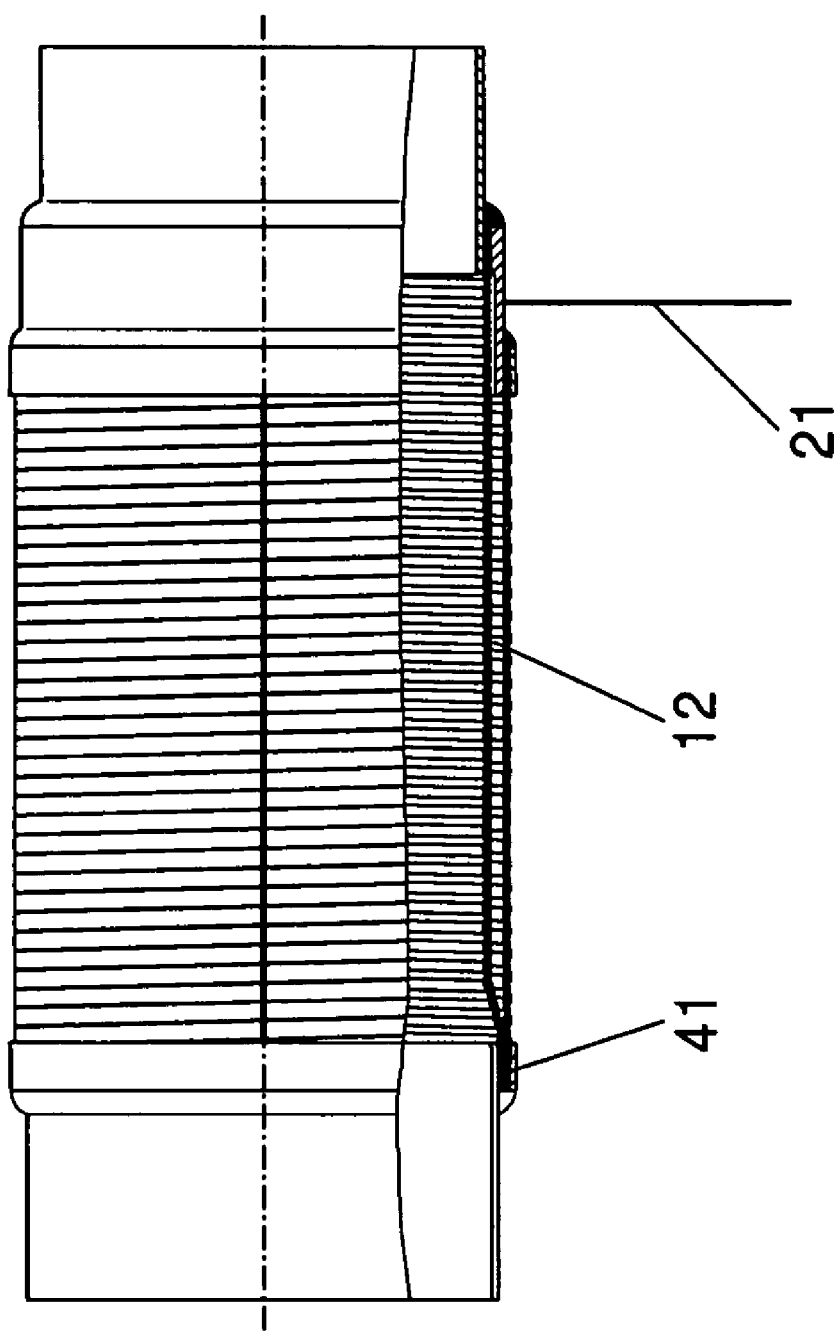
FIG. 4 shows a schematic illustration of another variation gas-tight decoupling element.

In a fifth variation as per FIG. 4, the connections limiting the decoupling element in an axial direction to the left or to the right are simplified by sizing the internal metal hose so that the two hoses can only be jointed at a radial jointing point (41).

Within the framework of an adaptation to a special application, combinations of the above variations are also possible. Furthermore all variations described may be fitted with redundant components in terms of compressed air supply, controls, and sensors so that optimum operational safety is ensured.

Besides their use in vehicle exhaust systems, the gas-tight decoupling element produced from stripwound hoses may also be used in industrial applications such as the exhaust systems of stationary turbines.

What is claimed is:

1. A decoupling element for an exhaust system in a vehicle, comprising:
   at least two multi-layer stripwound metal hoses arranged in coaxial relationship to allow residual leakage;
   axial edge elements attached to the metal hoses to thereby form at least one annular cavity between the two stripwound hoses; and
   a pneumatic connection for build-up of air pressure into the cavity in the operative conditions, with the air pressure being as high as or higher than a dynamic pressure generated by an exhaust gas flow building up inside an innermost of the metal hoses to prevent escape of exhaust gas.

2. The decoupling element according to claim 1, further comprising an additional pressure relief valve to limit the pressure in the annular cavity to a defined value.

3. The decoupling element according to claim 1, further comprising additional controls and a control algorithm for adapting the pressure in the annular cavity to the dynamic pressure of the exhaust gas flow and for minimizing a pressure difference and a resulting leakage flow from the annular external cavity to a cylindrical inside cavity.

4. The decoupling element according to claim 1, further comprising an additional sensor diagnosing a correct operating condition and transmitting the result as an electrical signal to display instruments in a cab of the vehicle and providing the result of the diagnosis to an electrical system of the vehicle for further analysis.

5. The decoupling element according to claim 1, further comprising redundant controls and sensors in order to ensure operational safety.

6. The decoupling element according to claim 1, further comprising a compressor which feeds compressed ambient air to the annular cavity.

7. The decoupling element according to claim 1, further comprising a compressor and a connection to the exhaust system so that compressed, cleaned exhaust gas is fed to the annular cavity.

8. The decoupling element according to claim 1, wherein the annular cavity is supplied with compressed air from a pneumatic system of the vehicle.

9. The decoupling element according to claim 1, further comprising a dampening device disposed in the annular cavity between the stripwound hoses to substantially prevent a metallic contact between the two stripwound hoses and to substantially prevent noise generated under vibration.

10. The decoupling element according to claim 1, wherein at least one of the stripwound hoses has a lay-on profile.

11. The decoupling element according to claim 1, wherein at least one of the stripwound hoses has a Agraff profile.

12. The decoupling element according to claim 1, wherein at least one of the stripwound hoses has a scale profile.

13. The decoupling element according to claim 1, wherein at least one of the stripwound hoses has a double scale profile.

* * * * *